United States Patent
Bailey

(10) Patent No.: US 10,423,417 B2
(45) Date of Patent: Sep. 24, 2019

(54) FAULT TOLERANT PROCESSOR FOR REAL-TIME SYSTEMS

(71) Applicant: MIPS Tech, LLC, Santa Clara, CA (US)

(72) Inventor: Julian Bailey, Watford (GB)

(73) Assignee: MIPS Tech, LLC, Campbell, CA (US)

( * ) Notice: Subject to any disclaimer, the term of this patent is extended or adjusted under 35 U.S.C. 154(b) by 12 days.

(21) Appl. No.: 14/741,738

(22) Filed: Jun. 17, 2015

(65) Prior Publication Data

US 2016/0321078 A1 Nov. 3, 2016

(30) Foreign Application Priority Data

May 1, 2015 (GB) .................................. 1507585.6

(51) Int. Cl.
*G06F 11/00* (2006.01)
*G06F 9/38* (2018.01)
*G06F 11/14* (2006.01)

(52) U.S. Cl.
CPC ............ *G06F 9/3802* (2013.01); *G06F 11/00* (2013.01); *G06F 11/1492* (2013.01); *G06F 11/1494* (2013.01); *G06F 11/1497* (2013.01)

(58) Field of Classification Search
CPC ..... G06F 11/1492–1497; G06F 9/3802; G06F 11/00; G06F 11/1494
See application file for complete search history.

(56) References Cited

U.S. PATENT DOCUMENTS

| | | | | |
|---|---|---|---|---|
| 6,026,421 A * | 2/2000 | Sabin | .................... | G06F 7/5443 708/491 |
| 6,460,173 B1 * | 10/2002 | Schreiber | ............ | G06F 17/5045 716/104 |
| 6,615,366 B1 * | 9/2003 | Grochowski | ....... | G06F 9/30076 712/1 |
| 6,757,811 B1 * | 6/2004 | Mukherjee | ............ | G06F 9/3842 710/34 |
| 6,938,183 B2 * | 8/2005 | Bickel | ................. | G06F 11/1658 714/12 |
| 2005/0108509 A1 | 5/2005 | Safford et al. | | |
| 2005/0138478 A1 | 6/2005 | Safford et al. | | |
| 2005/0193283 A1 * | 9/2005 | Reinhardt | ........... | G06F 11/1497 714/48 |

(Continued)

OTHER PUBLICATIONS

Steven K. Reinhardt and Shubhendu S. Mukherjee. 2000. Transient fault detection via simultaneous multithreading. SIGARCH Comput. Archit. News 28, (May 2, 2000), 25-36 (Year: 2000).*

(Continued)

*Primary Examiner* — Jason B Bryan
(74) *Attorney, Agent, or Firm* — Adams Intellex, PLC

(57) ABSTRACT

A fault tolerant multi-threaded processor uses the temporal and/or spatial separation of instructions running in two or more different threads. An instruction is fetched, decoded and executed by each of two or more threads to generate a result for each of the two or more threads. These results are then compared using comparison hardware logic and if there is a mismatch between the results obtained, then an error or event is raised. The comparison is performed on an instruction by instruction basis so that errors are identified (and hence can be resolved) quickly.

11 Claims, 3 Drawing Sheets

(56) References Cited

U.S. PATENT DOCUMENTS

| | | | |
|---|---|---|---|
| 2006/0150186 A1* | 7/2006 | Grayver | G06F 11/1494 718/102 |
| 2006/0236168 A1 | 10/2006 | Wolfe et al. | |
| 2008/0052494 A1 | 2/2008 | Weiberle et al. | |
| 2008/0091927 A1 | 4/2008 | Mueller et al. | |
| 2008/0244354 A1* | 10/2008 | Wu | G06F 11/1407 714/755 |
| 2011/0047364 A1* | 2/2011 | Koju | G06F 9/3834 712/228 |
| 2011/0179308 A1 | 7/2011 | Pathirane et al. | |
| 2013/0254592 A1* | 9/2013 | Yamada | G06F 11/1492 714/10 |

OTHER PUBLICATIONS

European Search Report for EP Application No. 16 16 7141, completed Oct. 10, 2016, two pages.
Lecture Notes, "CIS 501 Introduction to Computer Architecture," Fall 2005, https://www.cis.upenn.edu/~milom/cis501-Fall05/.
High Performance Computing—HiPC 2006: 13th International Conference Bangalore, India, Dec. 18-21, 2006, Proceedings by Yves Robert (excerpt).

* cited by examiner

FAULT TOLERANT PROCESSOR FOR REAL-TIME SYSTEMS

BACKGROUND

Fault tolerant systems are systems which are designed to continue working even in the presence of some errors. Such systems may therefore involve redundancy and use of error checking mechanisms. In real-time fault tolerant systems it is important that errors in calculations can be identified and resolved quickly. Real-time fault tolerant systems may, for example, be used in systems where safety is critical (e.g. control systems for cars, planes, spacecraft or nuclear power plants), where maintenance is infrequent (e.g. for space applications such as on satellites) or where errors can have serious consequences (e.g. in financial systems). In all these applications, errors need to be identified and resolved as soon as possible (e.g. in real-time) as rectifying them later may be infeasible or impossible.

The embodiments described below are not limited to implementations which solve any or all of the disadvantages of known fault tolerant processors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A fault tolerant multi-threaded processor is described which uses the temporal and/or spatial separation of instructions running in two or more different threads. An instruction is fetched, decoded and executed by each of two or more threads to generate a result for each of the two or more threads. These results are then compared using comparison hardware logic and if there is a mismatch between the results obtained, then an error or event is raised. The comparison is performed on an instruction by instruction basis so that errors are identified (and hence can be resolved) quickly.

A first aspect provides a multi-threaded processor comprising: a scheduler implemented in hardware logic and arranged, in a first mode of operation, to cause an instruction in a program to be fetched by each of a plurality of threads; an execution stage implemented in hardware logic and arranged, in the first mode of operation, to execute each fetched instance of the instruction to generate a plurality of results for the instruction, one result for each of the plurality of threads; and comparison hardware logic arranged, in the first mode of operation, to compare the plurality of results for the instruction to determine if all the results match.

A second aspect provides a method of operating a multi-threaded processor comprising: fetching an instruction in a program by each of a plurality of threads; executing each fetched instance of the instruction to generate a plurality of results for the instruction, one result for each of the plurality of threads; and comparing the plurality of results.

Further aspects provide a computer readable storage medium having encoded thereon computer readable program code for generating a processor as described herein, a non-transitory computer readable storage medium having stored thereon computer readable instructions that, when executed at a computer system for generating a representation of a digital circuit from definitions of circuit elements and data defining rules for combining those circuit elements, cause the computer system to generate a processor as described herein and a computer readable storage medium having encoded thereon computer readable program code for generating a processor configured to perform the method described herein.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
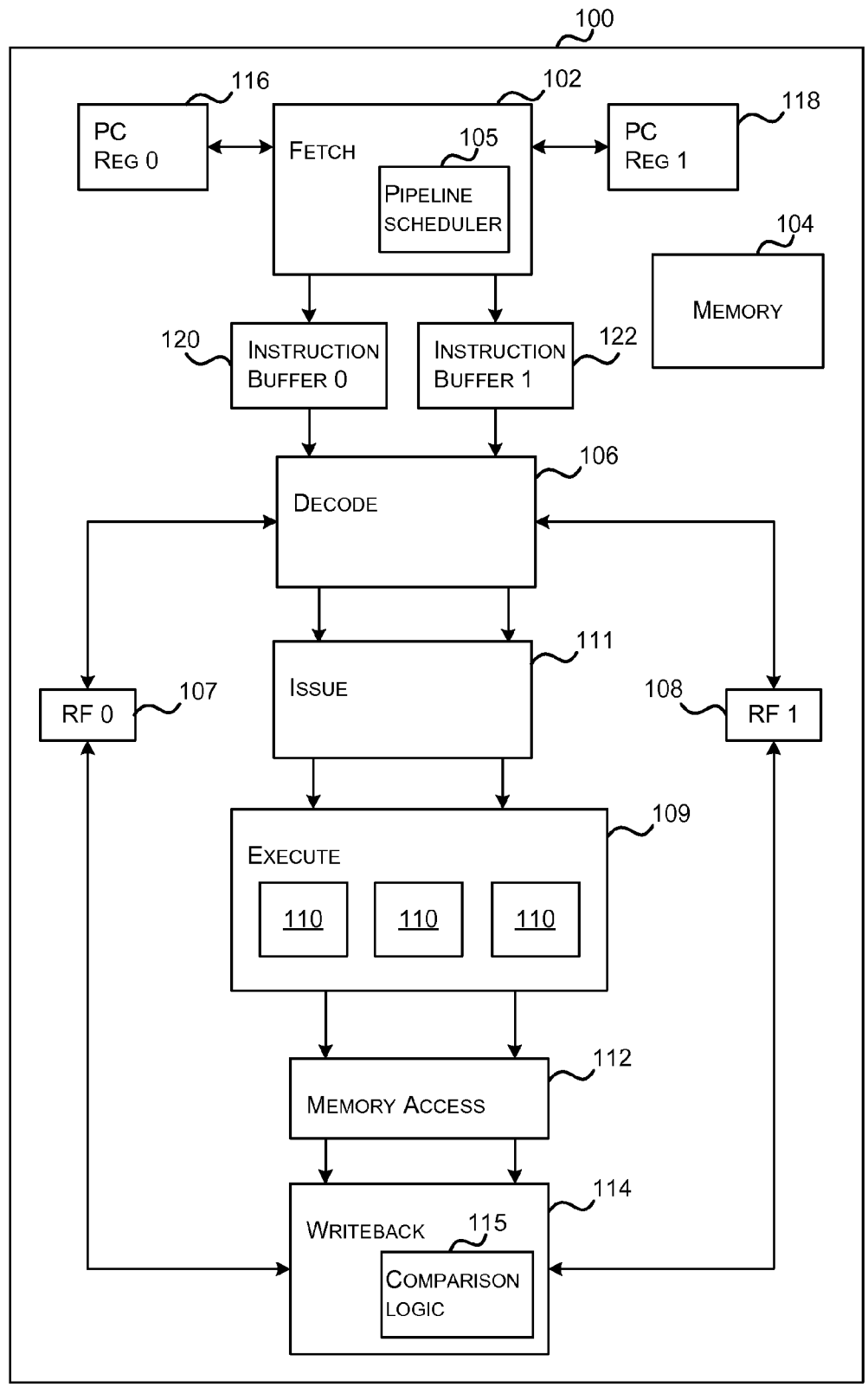
FIG. 1 shows a schematic diagram of an example fault tolerant multi-threaded in-order processor.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Fault tolerant processors must continue to operate even in the presence of a number of errors. Techniques used in existing fault tolerant processors involve using multiple processor cores to execute the same code, with results being compared at the end of each operation. If the results are not identical then the comparison signals an error. Alternatively, where there are more than two cores, a voting system may be used to decide which result is correct (i.e. with the result obtained by the majority of cores being taken as the correct result).

An alternative design of fault tolerant processors is described herein which uses multi-threading (and in particular fine-grained multi-threading) within a single processor core and uses the temporal and/or spatial separation of instructions running in two different threads in a multi-threaded processor pipeline. This results in a reduction in both the size (or area) of the processor and the power consumption of the processor compared to the use of multiple cores. The fault tolerant processors as described below may therefore be particularly suited to applications where space and/or power are constrained (e.g. battery powered portable computing devices, wearable devices, etc.); however, they may also be used in other applications.

FIG. 1 shows a schematic diagram of an example fault tolerant multi-threaded in-order processor 100 which implements fine-grained multi-threading and hence changes threads on each cycle. In this example the multi-threaded processor 100 is a two-threaded processor (with the threads denoted thread 0 and thread 1); however, the methods are also applicable to multi-threaded processors with different numbers of threads (e.g. four or more threads).

The multi-threaded processor 100 comprises a multi-stage pipeline including a fetch stage 102, a decode stage 106, an issue stage 111, an execution stage 109, a memory access stage 112 (although this may be omitted in some processors) and a writeback stage 114. The execution stage 109, memory access stage 112 (where provided) and the writeback stage 114 are shared between the threads whereas in the front end (comprising the fetch stage 102, decode stage 106 and issue stage 111) some elements, such as buffers 120, 122, are separate (i.e. duplicated) for each thread. In various examples, the decode stage 106 may also be duplicated, with a separate decode stage 106 for each thread.

The fetch stage 102 is configured to fetch instructions from a program (in program order) as indicated by a program counter (PC). The program may be stored in memory 104 (which may include a cache to reduce the latency of accessing the memory). A scheduler 105 (which may be referred to as a 'pipeline scheduler') within the fetch stage 102 controls the order in which instructions are fetched and by which thread.

The decode stage 106 is arranged to interpret the instructions which have been fetched by the fetch stage 102 and this typically involves reading from one or more register files (RFs); in the example shown in FIG. 1, separate register files 107, 108 are provided for each of the threads.

The issue stage 111 selects a thread to be executed each cycle and hence controls the order in which instructions are passed along the pipeline to the execution stage 109. The issue stage 111 may, therefore be described as comprising a second scheduler (with the first scheduler being scheduler 105 in the fetch stage 102). In some processors this issue stage 111 may be omitted (and in various examples it may be replaced by a shared instruction buffer) such that the instructions proceed through the processor pipeline in the order that they were fetched (and hence the scheduler 105 implicitly controls the order in which instructions are executed).

The execution stage 109 comprises one or more functional (or execution) units 110. Each functional unit 110 is responsible for executing instructions and a functional unit may be configured to execute specific types of instructions. For example one or more functional units 110 may be a load/store unit, an integer unit, a floating point unit (FPU), a digital signal processing (DSP)/single instruction multiple data (SIMD) unit, or a multiply accumulate (MAC) unit. A load/store unit performs load and store memory instructions, an integer unit performs integer instructions, an FPU executes floating point instructions, a DSP/SIMD unit has multiple processing elements that perform the same operation on multiple data points simultaneously, and a MAC unit computes the product of two numbers and adds that product to an accumulator. The functional units and the pipelines therein may have different lengths and/or complexities. For example, a FPU pipeline is typically longer than an integer execution pipeline because it is generally performing more complicated operations.

The memory access stage 112 (where implemented) is arranged to perform any data memory accesses.

The writeback stage 114 (which may also be referred to as the commit stage or the graduation unit) commits the results of the instruction to the register/memory (e.g. to register files 107, 108) and/or writes the results to an output (e.g. to an output device). The writeback stage 114 comprises comparison hardware logic 115 and the operation of this logic 115 is described below.

As shown in FIG. 1, as well as providing separate register files 107, 108, separate registers 116, 118 may be used to store the current PC for each of the threads in the processor 100 and separate instruction buffers 120, 122 may be used to buffer instructions for each thread between the fetch and decoding stages 102, 106. As described above, in the absence of a second scheduler (in the issue stage 111), a single shared instruction buffer may be provided (instead of separate instruction buffers 120, 122).

The multi-threaded processor 100 may also include functional elements other than those shown in FIG. 1. It will be appreciated that other processors may not contain all the functional elements shown in FIG. 1 (i.e. one or more of the functional elements shown in FIG. 1 may be omitted).

The processor 100 shown in FIG. 1 may operate in two modes of operation: a fault tolerant mode (e.g. for particular programs) and a non-fault tolerant or standard mode (e.g. for other programs) and at any time the mode in which the processor operates (i.e. the current mode of operation) may be selected by setting a bit in a register or by any other suitable technique. Alternatively, the processor 100 may always operate in the fault tolerant mode of operation.

In the non-fault tolerant or standard mode of operation, each instruction in a program is fetched once by a single thread and each thread may fetch instructions from the same program or from different programs. In this standard mode of operation, an instruction in a program is only fetched more than once if the processor is re-wound for some reason or if the program is executed more than once.

In the fault tolerant mode of operation, however, each instruction is fetched, decoded and subsequently executed by two or more threads (e.g. by both thread 0 and thread 1 in the processor 100 of FIG. 1) and the different instances of the same instruction (one instance for each thread that fetches the instruction) are interleaved as they proceed through the processor pipeline. In various examples, each instruction may be fetched by M threads where M≥2 and the processor may comprise N threads where N≥M and for the purposes of the examples described below only N=M=2. The results of executing each instruction (i.e. the M results obtained by executing each of the M instances of the same instruction) are compared in the comparison hardware logic 115 within the writeback stage 114 as soon as all instances of the same instruction have been executed (e.g. to minimize any delay between the error occurring and the error being identified). The fault tolerant mode of operation is described in more detail below with reference to FIG. 2.

Figure 2:
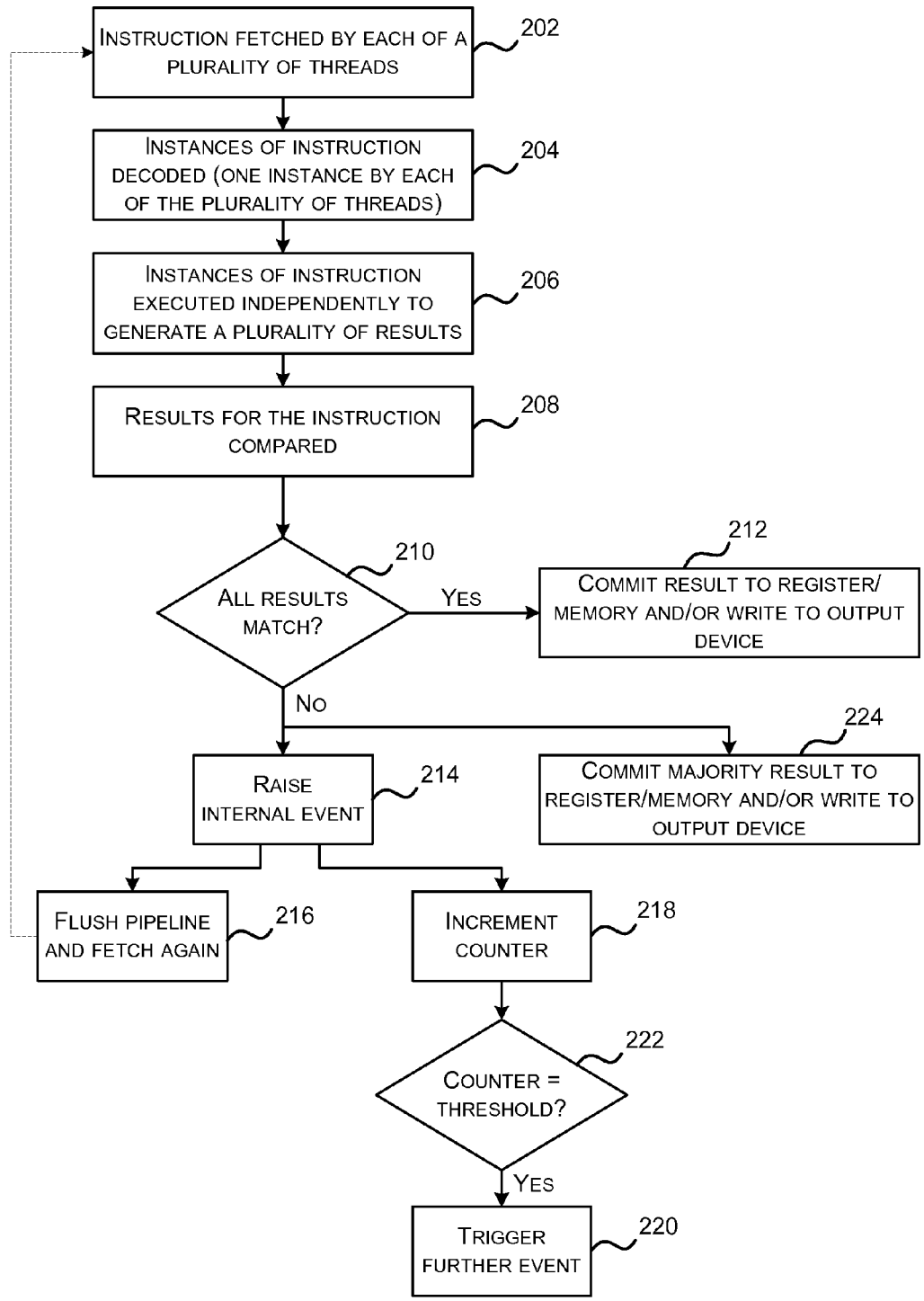
FIG. 2 is a flow diagram showing an example fault tolerant mode of operation of a multi-threaded processor, such as the processor shown in FIG. 1.

FIG. 2 is a flow diagram showing an example fault tolerant mode of operation of a multi-threaded processor, such as the processor 100 shown in FIG. 1. In this mode of operation (which, as described above, may be the sole mode of operation of the processor or one of a number of possible modes of operation of the processor), each instruction is separately fetched for two or more threads (block 202), e.g. under the control of the scheduler 105. The instructions may, for example, be fetched from two (or more generally, M) separate copies of the same program which are stored in memory (e.g. in memory 104 at spatially separate locations) or alternatively, there may only be a single copy of the program stored in memory from which an instruction is fetched more than once (i.e. M times) and error correction techniques may be used within the memory to address any errors which occur within the memory that is used to store the program.

The two or more instances of the same instruction are fetched (in block 202) one after the other by the different threads (i.e. with each thread fetching an instance of the same instruction). In some examples, the scheduler may cause the threads to fetch instances of an instruction in the same order for each instruction (e.g. instruction 1 is fetched first by thread 0 and then by thread 1 and then instruction 2 is fetched by thread 0 and then by thread 1) or the order may vary as long as all the instances are fetched one after the other (e.g. instruction 1 is fetched first by thread 0 and then by thread 1 and then instruction 2 is fetched by thread 1 and then by thread 0).

In various examples, the instances of the same instruction are scheduled strictly back to back (i.e. one after the other without any other instructions in between); however, in other examples this may be relaxed slightly such that they are scheduled closely together (so that the latency in committing results and then writing them to memory is not increased significantly) but are not necessarily scheduled immediately one after each other (e.g. all M instances may be scheduled within M+Δ cycles, where Δ is a small integer).

Once each thread has fetched an instance of the instruction (in block 202), each thread decodes the fetched instance of the instruction (block 204, e.g. in the decode stage 106 with instructions being buffered in instruction buffers 120, 122 if necessary) and the instances of the same instruction are then executed independently to generate a plurality of results (one per instance and M results in total) for the same instruction (block 206). In the absence of a second scheduler (e.g. in the issue stage 111), the instances of each instruction are executed substantially in the same order as they were fetched (in block 202) under the control of the pipeline scheduler 105.

The execution of the multiple (i.e. M) instances of the same instruction (in block 206) may be described as being in lockstep because they are run together, either in parallel or one after the other. In many example implementations M=2 (as shown in FIG. 1). In other example implementations M=3. It will be appreciated, however, that M may alternatively be a value greater than three.

Figure 3:
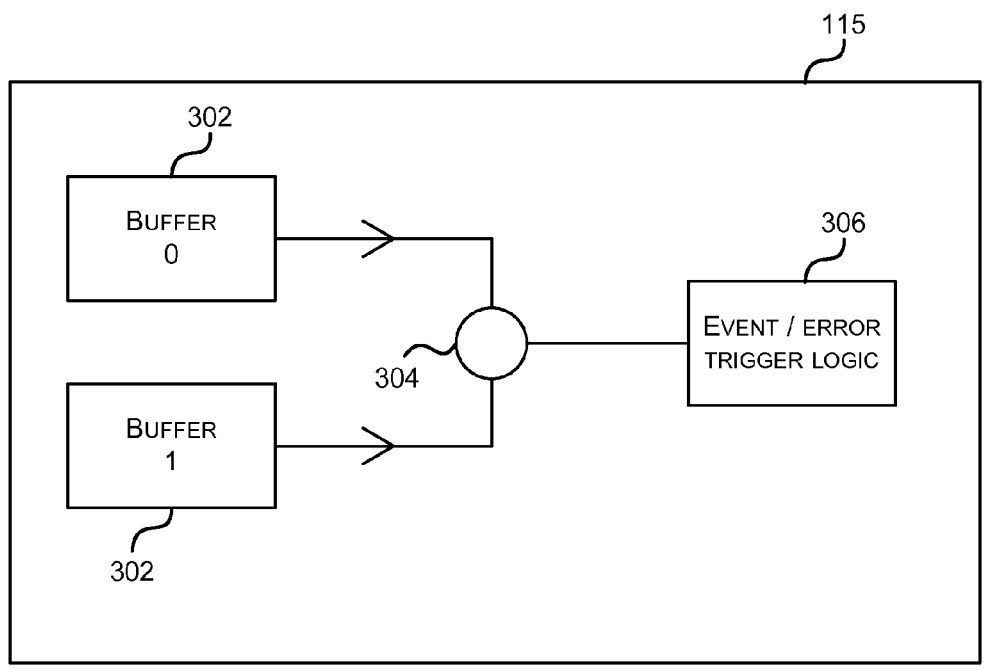
FIG. 3 shows a schematic diagram of an example implementation of the comparison hardware logic from the processor shown in FIG. 1.

Once all the instances of the same instruction have been executed (and hence results generated), the results are compared (block 208), e.g. in the comparison hardware logic 115 within the final stage of the processor pipeline (e.g. the writeback stage 114). FIG. 3 shows a schematic diagram of an example implementation of this comparison hardware logic 115 which comprises one or more buffers 302 to store the incoming results when generated (e.g. M buffers each arranged to store a single result or one buffer arranged to store M results or M−1 results) and comparator logic 304 which performs the comparison of the results (in block 208).

In the event that all the results (from each of the instances of the same instruction) are the same ('Yes' in block 210) then the processor can continue as normal and commit the result to register/memory and/or write the result to an output device (block 212).

In the event that the results are not all the same ('No' in block 210) then the event/error trigger logic 306 in the comparison hardware logic 115 may trigger an event and/or error (block 214). For example, an internal pipeline event or interrupt may be triggered (in block 214) which causes the flushing of the processor pipeline and the re-fetching and execution of the instruction which generated the results did not match (block 216), i.e. the processor is re-wound and the method of FIG. 2 repeated for the particular instruction where the generated results were not all the same.

In addition to, or instead of, raising an event/error (in block 214), the comparison hardware logic 115 may increment a counter (block 218) which may be referred to as a performance counter. The performance counter may, for example, track the number of errors which occur and this may be used to trigger further events (block 220) such as the raising of error flags or interrupts in the event that the counter value reaches or exceeds a threshold value ('Yes' in block 222).

In a processor where there are more than two threads and a single instruction is fetched by more than two threads, instead of (or in addition to) raising an event/error (in block 214) and/or incrementing a performance counter (in block 218), the result which is obtained by the execution of the majority of the instances of the instruction may be taken to be the actual (or correct) result and committed to register/memory and/or written to an output device (block 224).

As the comparison is performed (in block 208) on an instruction by instruction basis (i.e. after each instruction has been executed rather than after a group of instructions or the whole program), any errors can be identified (and then resolved) more quickly which may be particularly important in real-time systems. For example, where such a fault tolerant processor is used in the control of a driverless car, it is important that errors are rectified immediately before the error can cause a malfunction or accident.

As the different threads (which execute the different instances of the same instruction) use different registers, the methods described herein will identify errors which cause a bit to be flipped in a register.

When executing the multiple instances of the same instruction on different threads within the processor, the threads may, in some examples, share caches although in other examples, different threads may use different caches. Where a cache is shared between threads, latency may be reduced because if the first thread executing an instance of an instruction experiences a cache miss, subsequent threads executing other instances of the same instruction will experience a cache hit. Furthermore, where the instances of the same instruction are scheduled back to back, there is less chance that data in a cache has changed (e.g. as a result of an error). Error correction techniques may also be used within a cache to identify (and in some cases to correct for) any errors.

Where M>2, it is possible to use a voting technique (in block 224) to determine a 'correct' result (which is the majority result) in situations where all the M results generated for a single instruction do not match (i.e. they are not all the same). This reduces the likelihood of having to flush of the processor pipeline and then re-fetch and re-execute the instruction. However, when M is increased, the overall throughput of the processor is reduced and so in various examples, M=3 may be used.

In order to implement the methods described above (e.g. the fault tolerant mode of operation), a processor (such as the one shown in FIG. 1) comprises additional comparison hardware logic 115 in the writeback stage 114. Additionally, one or more schedulers (e.g. scheduler 105) in the pipeline (e.g. in the fetch stage 102 and in some examples also in the issue stage 111) are modified to implement the sequential fetching and execution of the different instances of the same instruction by different threads. Only minimal changes to any software may be required.

Whilst FIG. 1 shows an in-order multi-threaded processor 100, it will be appreciated that the methods described above may also be implemented in an out-of-order processor as long as the instances of the same instruction are all implemented in lockstep (e.g. in parallel or sequentially) and are not re-ordered in a different way, as this would add considerable delay before the comparison (in block 208) could be performed and any error identified.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a processing unit as described herein.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A multi-threaded processor comprising:
   a scheduler implemented in hardware logic and arranged, in a first mode of operation, to cause each instruction in a program to be separately fetched and decoded by each of a plurality of threads within a single processor core, wherein each of the plurality of threads fetches an instance of the same instruction for subsequent execution;
   an execution stage within the single processor core, implemented in hardware logic and arranged, in the first mode of operation, for each instruction in the program: to separately execute each fetched instance of the fetched instruction to generate a plurality of results for the same instruction, wherein each executed instance of the same instruction fetched by one of the plurality of threads generates a separate result of the plurality of results; and
   comparison hardware logic within the single processor core, arranged, in the first mode of operation, for each instruction in the program: to compare the plurality of results for the instruction to determine if all the results match, wherein the comparison hardware logic is arranged to perform comparisons once the instances of the same instruction have been executed and before comparing results obtained from processing a next fetched instruction in the program;
   wherein the comparison hardware logic is further arranged to trigger an interrupt in response to determining that all the results do not match, wherein the interrupt causes a flushing of the execution stage and triggers the scheduler to cause an instance of the instruction in the program to be fetched and decoded again for each of the plurality of threads for subsequent execution.

2. A multi-threaded processor according to claim 1, wherein the comparison hardware logic is further arranged, in the first mode of operation, to permit a result obtained by executing an instance of the same instruction in one of said plurality of threads to be written to a register, memory, and/or an output device in response to determining that all the results match, wherein each result is obtained by executing one of the plurality of instances of the same instruction provided by one of the plurality of threads.

3. A multi-threaded processor according to claim 1, wherein the comparison hardware logic comprises:
   one or more buffers arranged to store the results for the instruction, wherein each of said results for the instruction was obtained by executing one of the plurality of instances of the same instruction provided by one of the plurality of threads;
   comparator hardware logic configured to compare the results for the instruction as soon as all instances of the same instruction have been executed; and
   event/error trigger logic arranged to trigger an error/event in response to the comparator hardware logic identifying that the results for the instruction are not all the same.

4. A multi-threaded processor according to claim 1, wherein
   the first mode of operation is a fault tolerant mode of operation.

5. A multi-threaded processor according to claim 1, further comprising a second mode of operation, and wherein in the second mode of operation:
   the scheduler is arranged to cause each instruction in a program to be fetched by a single thread;
   the execution stage is arranged to execute the single fetched instance of the instruction to generate a single result; and
   the comparison hardware logic is bypassed.

6. A multi-threaded processor according to claim 1, wherein the execution stage is arranged, in the first mode of operation, to interleave different instances of the same instruction, as they proceed through the execution stage.

7. A multi-threaded processor according to claim 1, further comprising a writeback stage arranged to write results of executed instructions to registers, memory, or an output device and wherein the writeback stage comprises the comparison hardware logic.

8. A multi-threaded processor according to claim 1, wherein the scheduler is arranged to cause the instruction in the program to be fetched by each of a plurality of threads from a plurality of separate copies of the program stored in memory at spatially separate locations.

9. A multi-threaded processor according to claim 1, wherein the instruction is an integer operation instruction or a floating point operation instruction.

10. A multi-threaded processor according to claim 5, wherein at any time the multi-threaded processor operates in either the first mode of operation or the second mode of operation.

11. A method of operating a multi-threaded processor comprising:
    fetching and decoding each instruction in a program by each of a plurality of threads within a single processor core, wherein each of the plurality of threads fetches an instance of the same instruction;
    executing within the single processor core, for each instruction in the program, each fetched instance of the same instruction to generate a plurality of results for the instruction, wherein each result is obtained by executing one of the plurality of instances of the same instruction that is provided by one of the plurality of threads;
    comparing within the single processor core the plurality of results for each instruction in the program, wherein for each instruction in the program the comparison is performed as soon as all instances of the same instruction have been executed and before comparing results obtained from processing a next fetched instruction in the program; and
    triggering an interrupt when all the results do not match, wherein the interrupt causes a flushing of an execution stage and triggers a scheduler to cause an instance of the instruction in the program to be fetched and decoded again for each of the plurality of threads for subsequent execution.

* * * * *